(12) United States Patent
Grimm et al.

(10) Patent No.: US 7,370,486 B2
(45) Date of Patent: May 13, 2008

(54) AIR-TREATMENT SYSTEM WITH SECONDARY CIRCUIT

(75) Inventors: Mark Thomas Grimm, Dunlap, IL (US); Dan Alan Spurgeon, Washington, IL (US); Sean Ronald Motszko, Edelstein, IL (US); Norval P. Thomson, Dunlap, IL (US); Ryan Patrick McEnaney, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 504 days.

(21) Appl. No.: 10/743,812

(22) Filed: Dec. 24, 2003

(65) Prior Publication Data

US 2005/0138942 A1    Jun. 30, 2005

(51) Int. Cl.
*F25D 17/02* (2006.01)
*B60H 1/32* (2006.01)

(52) U.S. Cl. .............................. 62/185; 62/201; 62/239; 236/1 B

(58) Field of Classification Search .................. 62/185, 62/201, 173, 176.1, 176.6, 178, 180, 199, 62/200, 239; 236/44 A, 44 C, 1 B
See application file for complete search history.

(56) References Cited

U.S. PATENT DOCUMENTS

| 572,250 | A | | 12/1896 | Du Faur |
| 5,333,678 | A | * | 8/1994 | Mellum et al. ................. 165/42 |
| 5,722,250 | A | | 3/1998 | Pomme |
| 6,016,662 | A | * | 1/2000 | Tanaka et al. ................. 62/199 |
| 6,038,877 | A | | 3/2000 | Peiffer et al. |
| 6,276,161 | B1 | | 8/2001 | Peiffer et al. |
| 6,457,324 | B2 | | 10/2002 | Zeigler et al. |
| 6,460,356 | B1 | * | 10/2002 | Tao et al. ..................... 62/175 |
| 6,932,148 | B1 | * | 8/2005 | Brummett et al. ............ 165/43 |
| 2004/0035130 | A1 | | 2/2004 | Amaral et al. |
| 2004/0065099 | A1 | * | 4/2004 | Grabon et al. ................. 62/201 |

* cited by examiner

*Primary Examiner*—Marc Norman
(74) *Attorney, Agent, or Firm*—Finnegan, Henderson, Farabow, Garrett & Dunner

(57) ABSTRACT

An air-treatment system includes a cooling circuit, a first heat exchanger in thermal communication with the cooling circuit, and a secondary circuit in thermal communication with the first heat exchanger. The air-treatment system also includes a controller in communication with at least one of the cooling circuit, the first heat exchanger, and the secondary circuit. The controller is operable to receive at least one input indicative of a desired ambient condition, operable to receive at least one input indicative of current ambient conditions, operable to receive at least one input indicative of at least one of the cooling circuit operation and secondary circuit operation, and operable to change the operation of at least one of the cooling circuit and the secondary circuit when the current ambient condition is outside of a desired operation condition range.

5 Claims, 6 Drawing Sheets

AIR-TREATMENT SYSTEM WITH SECONDARY CIRCUIT

TECHNICAL FIELD

The present invention relates generally to an air-treatment system, and more particularly to an air-treatment system with a secondary circuit.

BACKGROUND

Work machines typically include an operator cabin, which houses one or more machine controls and an operator interface. The operator cabin may be sealed from the environment and may include an air-treatment system providing for the comfort of the operator when the work machine operates in harsh environments.

The air-treatment system for a work machine may include a high-pressure refrigeration system driven by the engine and a low-pressure fluid circulation system. For example, U.S. Pat. No. 6,038,877 (the '877 patent) issued to Pfeiffer et al. on Mar. 21, 2000, describes an air-conditioning system having a power cell, a remote heat exchanger, and a low-pressure fluid circuit in communication with the heat exchanger. The power cell of the '877 patent includes a compressor, a condenser, an expansion device, and an evaporator in a closed high-pressure cooling circuit. The low-pressure circuit thermally interfaces with the condenser to remove heat from the high-pressure cooling circuit. The heat exchanger mounts in the cabin of a vehicle to allow for air to be cooled by the heat exchanger as it flows into the cabin.

The air-conditioning system of the '877 patent, however, does not include a control system and may operate inefficiently under a variety of environmental conditions. In addition, the system of the '877 patent does not include a heating circuit and can only cool the air entering the cabin. The system of '877 patent may lack functionality for simultaneous multi-space use, such as in a work machine having an operator cabin and a sleeping cabin.

The present invention overcomes one or more of the problems set forth above.

SUMMARY OF THE INVENTION

In one aspect, the present disclosure pertains to an air-treatment system that includes a cooling circuit, a first heat exchanger in thermal communication with the cooling circuit, and a secondary circuit in thermal communication with the heat exchanger. The air-treatment system also includes a controller in communication with at least one of the cooling circuit, the first heat exchanger, and the secondary circuit. The controller is operable to receive at least one input indicative of a desired ambient condition, of current ambient conditions, and of at least one of the cooling circuit operation and secondary circuit operation, and is further operable to change the operation of at least one of the cooling circuit and the secondary circuit when the current ambient condition is outside of a desired ambient condition range.

In another aspect, the present disclosure pertains to a method of treating ambient air in a work machine. The method includes operating a cooling circuit to cool a refrigerant and operating a secondary circuit to selectively transfer heat from at least one of an operator cabin and a sleeping cabin of the work machine to the cooled refrigerant. The method further includes receiving at least one input indicative of a desired ambient condition, a current ambient condition, and of at least one of a cooling circuit operation and a secondary circuit operation, and changing at least one of the cooling circuit operation and the secondary circuit operation when the desired ambient condition is outside of a desired ambient condition range.

DETAILED DESCRIPTION

Figure 1:
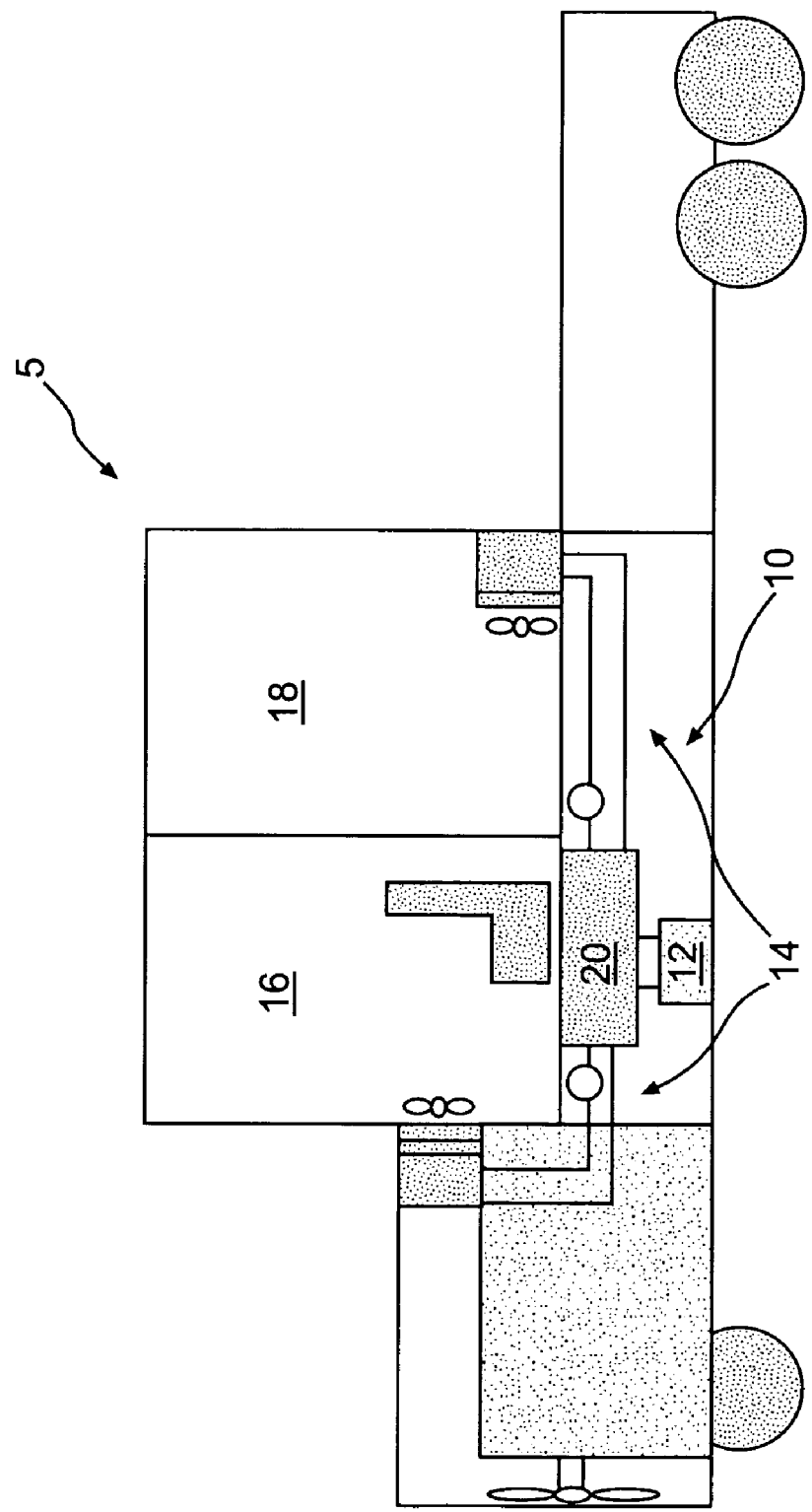
FIG. 1 is a pictoral illustration of a work machine having an air-treatment system according to an exemplary embodiment of the present invention.

FIG. 1 illustrates an exemplary embodiment of an air-treatment system 10 for a work machine 5. Air-treatment system 10 may include a cooling circuit 12 working in cooperation with a secondary circuit 14. Cooling circuit 12, having high-pressure fluid lines, may be conveniently located anywhere on work machine 5, such as in an engine compartment or outside of an operator cabin 16 or a sleeping cabin 18. Secondary circuit 14, having low-pressure fluid lines, may be thermally connected to cooling circuit 12 via a fluid-to-fluid heat exchanging device (HX) 20. Secondary circuit 14 may be in fluid communication with both operator cabin 16 and sleeping cabin 18.

Figure 2:
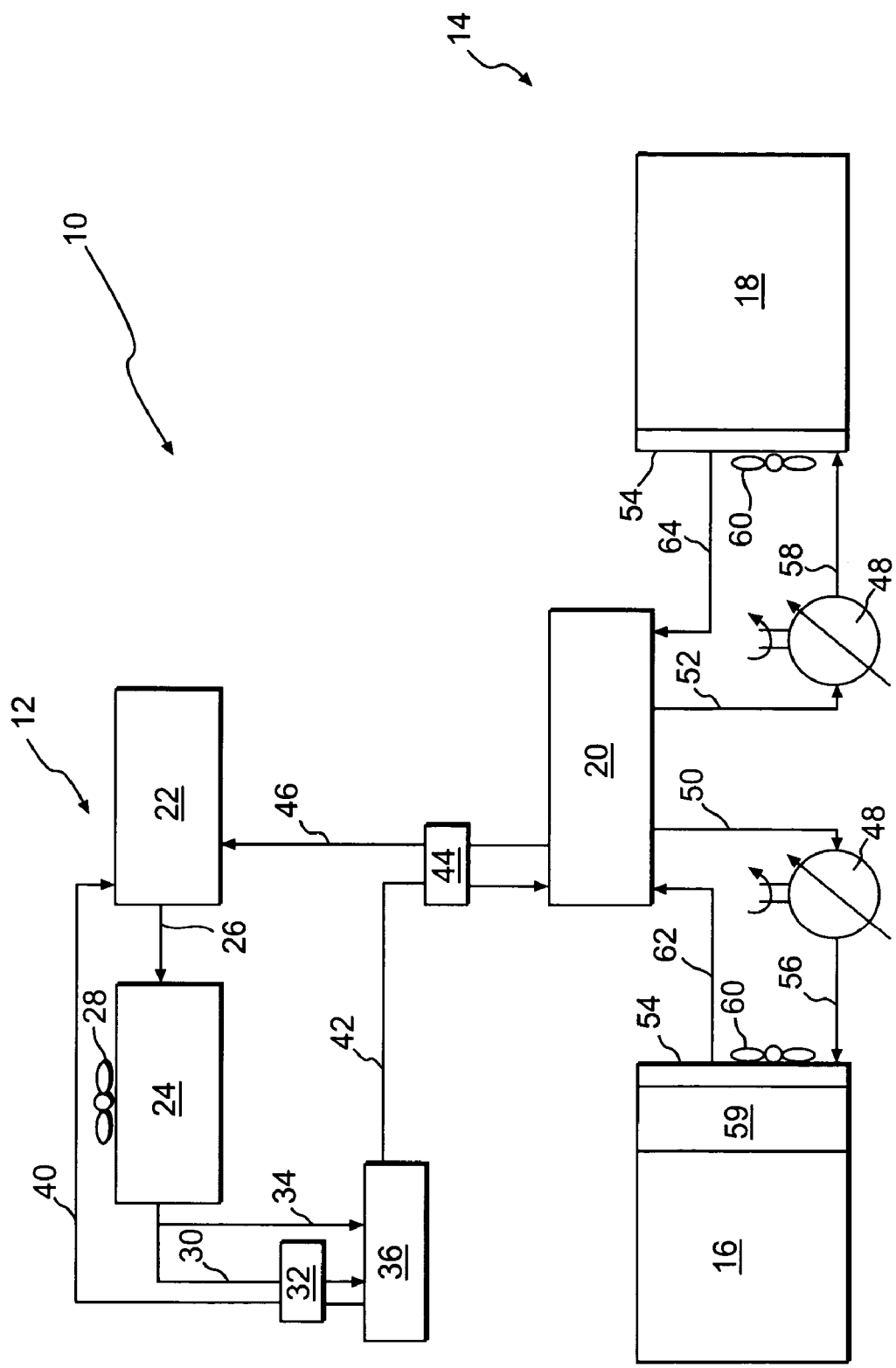
FIG. 2 is a diagrammatic illustration of an air-treatment system according to an exemplary embodiment of the present invention.

Cooling circuit 12 may be modular and compact with hard-brazed tubing that reduces the risk of leaks or rupture. Cooling circuit 12 may include a high-pressure refrigerant such as, for example, $CO_2$, R-134a, R-410, R-22, or any other refrigerant known in the art. As illustrated in FIG. 2, cooling circuit 12 may include a compressor 22, a condenser 24, a condenser fan 28, a first thermal expansion valve (TXV) 32, a vapor-injection heat exchanger (VIHX) 36, and a second TXV 44. Cooling circuit 12 may be hermetically sealed.

Compressor 22 may be any type of refrigerant compressing device such as, for example, a scroll-type compressor, or any other device known in the art. Compressor 22 may be driven in a variety of ways. For example, compressor 22 may include a direct drive coupled to a power source, a belt drive, a hydraulic drive, an electric drive, or any other appropriate driving arrangement. Compressor 22 may also include an integral pressure lubrication sump (not shown) for holding a supply of lubricant.

Compressor 22 may be in fluid communication with condenser 24 via a fluid passageway 26. Condenser 24 may be a two-phase heat-exchanging device for converting a high-temperature and high-pressure refrigerant from a vapor phase to a liquid phase through heat rejection. Condenser fan 28 may be disposed relative to condenser 24 such that condenser fan 28 can blow ambient air across condenser 24.

Condenser 24 may be in fluid communication with VIHX 36 via a fluid passageway 30 and a fluid passageway 34. VIHX 36 may also be fluidly connected to compressor 22 via a fluid passageway 40. TXV 32 may be disposed in fluid passageways 30 and 40 between condenser 24 and compressor 22, and VIHX 36. VIHX 36 may be a refrigerant-to-refrigerant heat exchanger.

VIHX 36 may be fluidly connected to HX 20 via a fluid passageway 42. HX 20 may be type of two-phase heat exchanger for exchanging heat between two circuits of fluid, such as a flat plate heat exchanger. HX 20 may be fluidly connected to compressor 22 via a fluid passageway 46. TXV 44 may be disposed in fluid lines 42 and 46 between VIHX 36 and compressor 22, and HX 20. TXV 44 may be a block-style TXV.

Secondary circuit 14 may be a low-pressure circuit in thermal communication with operator cabin 16, sleeping cabin 18, and HX 20. Secondary circuit 14 may include a low-pressure fluid such as, for example, water, glycol, a water-glycol mixture, a blended air mixture, or any other low-pressure fluid known in the art for transferring heat. Secondary circuit 14 may include two pumps 48, two heat exchangers 54, and two fans 60. Pumps 48 may be connected to HX 20 by fluid passageways 50 and 52 and may also be in fluid communication with heat exchangers 54 located in operator cabin 16 and in sleeping cabin 18 via fluid passageways 56 and 58. Heat exchangers 54 may also be in fluid communication with HX 20 via fluid passageways 62 an 64.

A heating device 59 may also be included in operator cabin 16 next to heat exchanger 54. In one embodiment, heating device 59 may be electrically powered. Moreover, heating device 59 may be any device for heating the air such as a heat exchanger with heated coolant. Heat exchanger 54 and heating device 59 in operator cabin 16 and heat exchanger 54 in sleeping cabin 18 may be located in airflow paths of fans 60.

Figure 3:
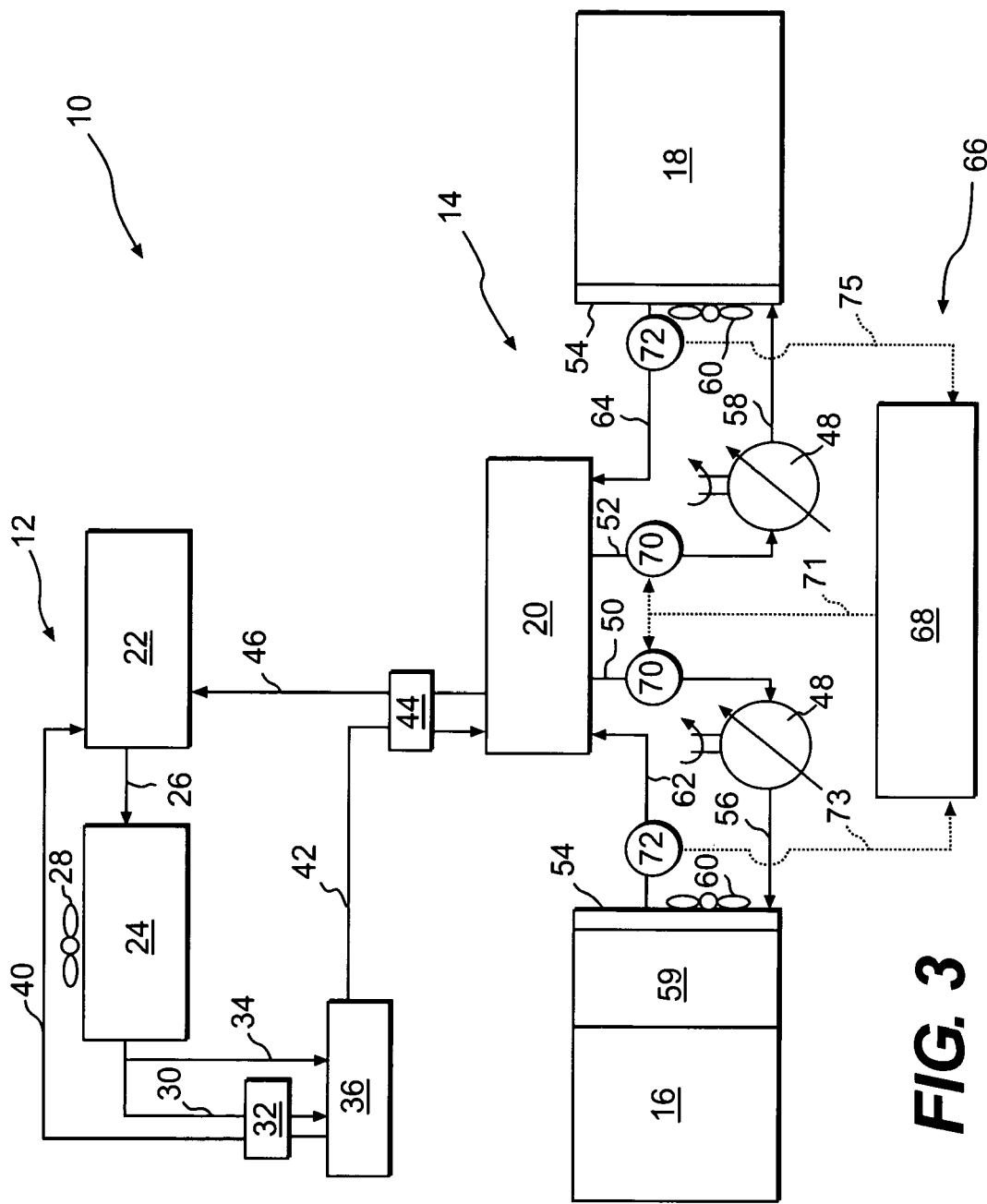
FIG. 3 is a diagrammatic illustration of the air-treatment system according to an exemplary embodiment of the present invention.

One or more heating circuits may also be in communication with secondary circuit 14, as illustrated in FIG. 3. One exemplary embodiment of the present disclosure may include a first heating circuit 66 fluidly connected to heat exchangers 54 associated with operator cabin 16 and sleeping cabin 18. First heating circuit 66 may contain a device for heating the fluid within first heating circuit 66. First heating circuit 66 may also include valves 70 and 72 connecting first heating circuit 66 to secondary circuit 14. In one embodiment, the heating device may be a fuel-fired coolant heater 68. However, the heating device may be any device to heat the fluid such as, for example, an electric coolant heater.

First heating circuit 66 may include valves 70 located in each of fluid passageways 50 and 52, and valves 72 located in each of fluid passageways 62 and 64. Fuel-fired coolant heater 68 may be connected to valves 70 via a fluid passageway 71, and to valves 72 via fluid passageways 73 and 75. It is also contemplated that the device for heating may also be configured to heat the fluid within secondary circuit 14 without the additional fluid passageways 71, 73, and 75. For example, The fuel-fired coolant heater 68 may directly heat the fluid in secondary loop 14. In the case of an electric coolant heater, the heating device may include electric heat coils wrapped around portions of fluid passageways 50 and 52 to directly heat the fluid within these passageways.

Figure 4:
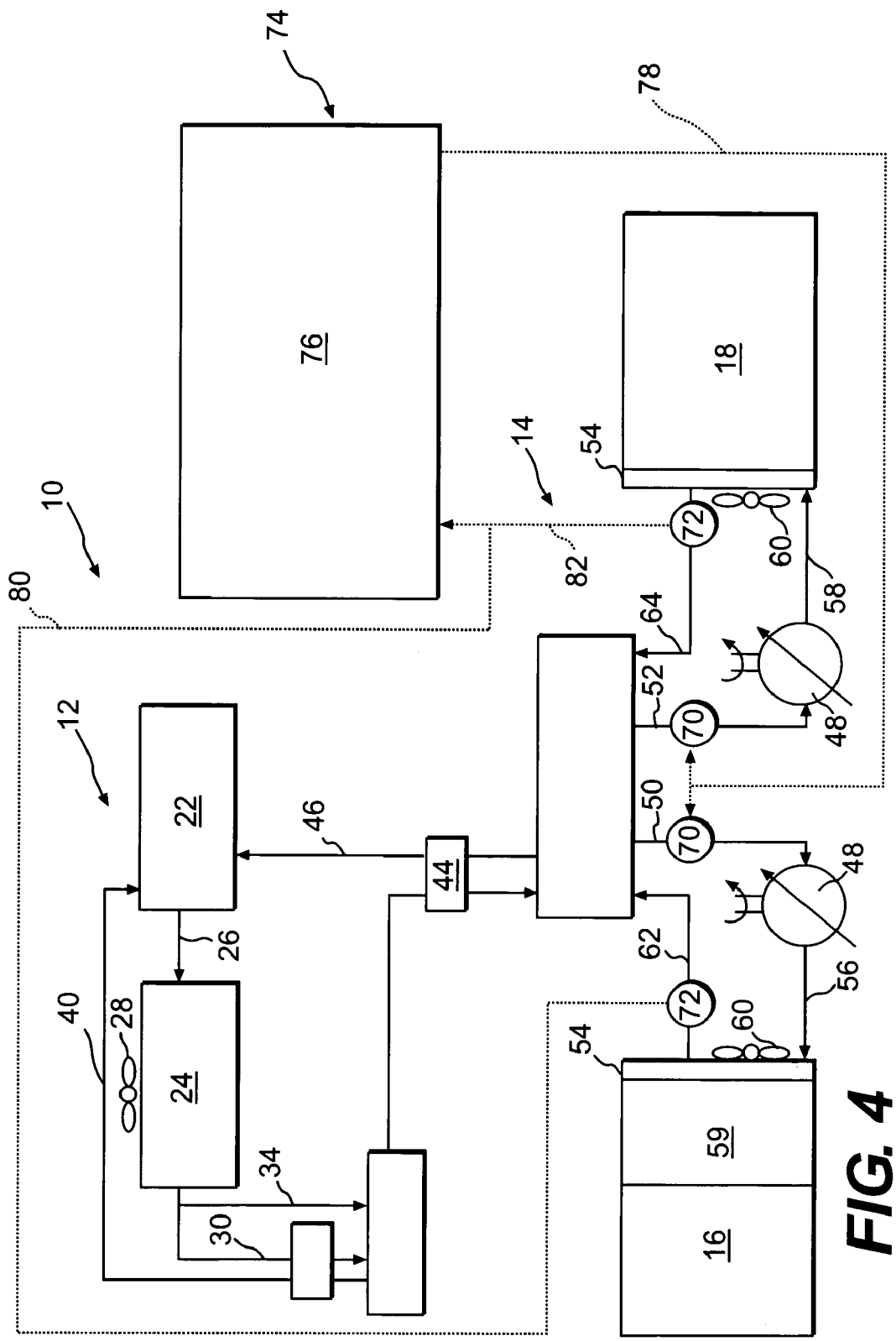
FIG. 4 is a diagrammatic illustration of the air-treatment system according to an exemplary embodiment of the present invention.

As illustrated in FIG. 4, another exemplary embodiment of the present disclosure may include a second heating circuit 74 integrated with a cooling system of an engine 76. Second heating circuit 74 may connect engine 76 to secondary circuit 14 via valves 70 and 72 and fluid passageways 78, 80, and 82.

Figure 5:
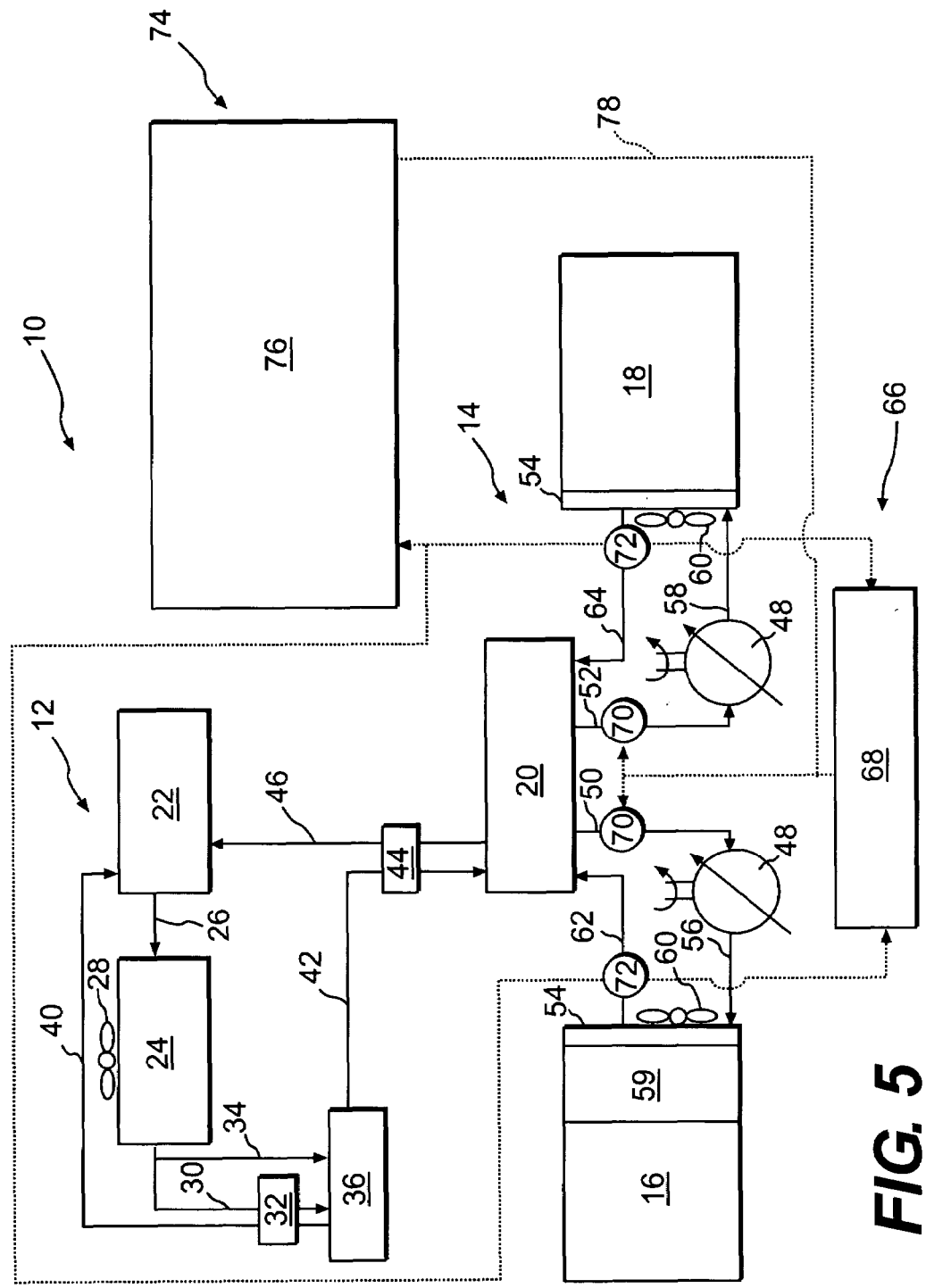
FIG. 5 is a diagrammatic illustration of the air-treatment system according to an exemplary embodiment of the present invention.

Another exemplary embodiment, as illustrated in FIG. 5, may include both first heating circuit 66 and second heating circuit 74. Both first heating circuit 66 and second heating circuit 74 may be connected to secondary circuit 14 via valves 70 and 72.

Figure 6:
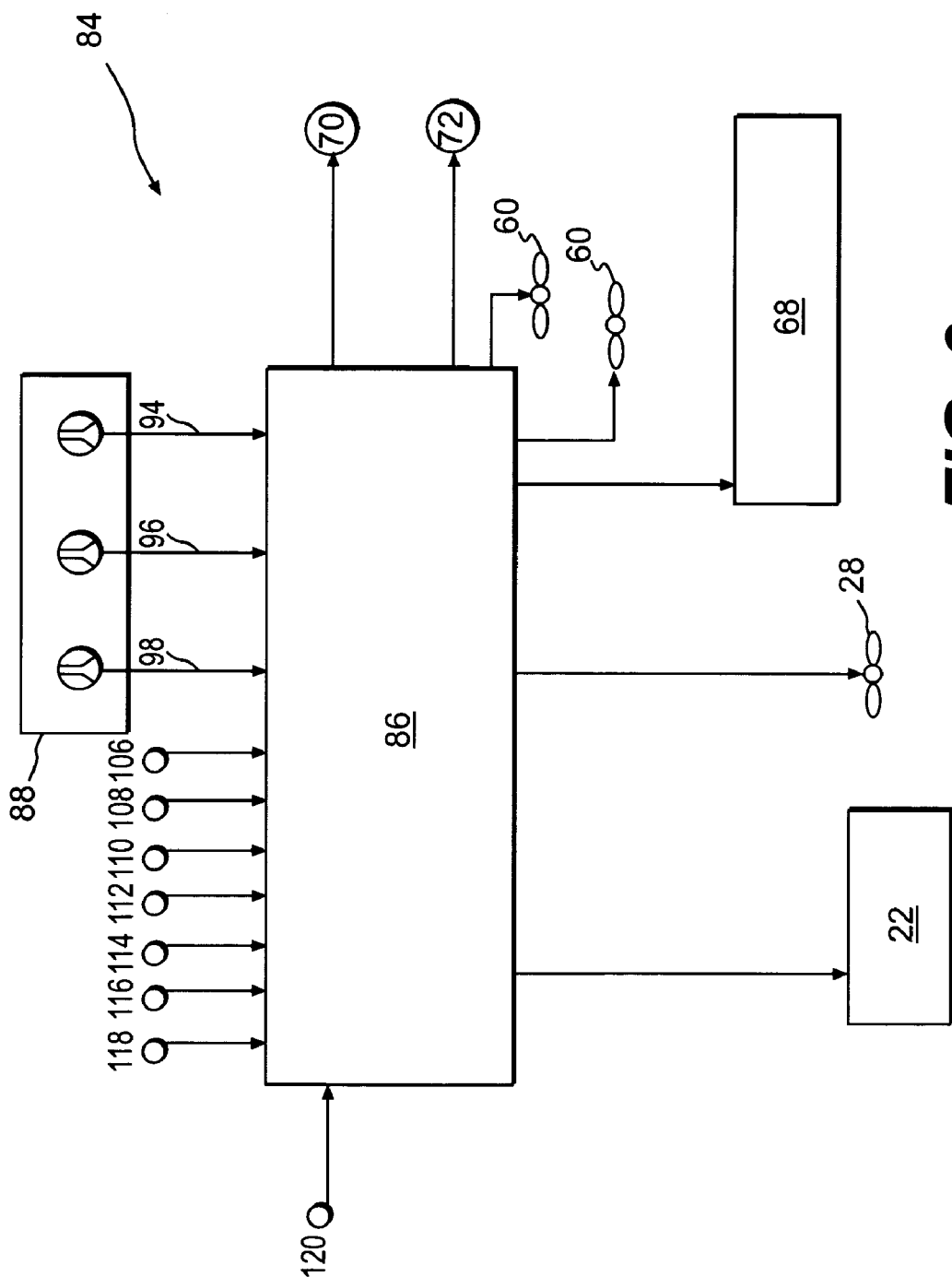
FIG. 6 is a diagrammatic illustration of a control system of the air-treatment system according to an exemplary embodiment of the present invention.

As illustrated in FIG. 6, air-treatment system 10 may include a control system 84 in communication with cooling circuit 12, secondary circuit 14 and first and second heating circuits 66, 74. Control system 84 may include a controller 86 and an operator interface 88 configured to receive input from the operator indicative of a desired ambient condition. Controller 86 may also be configured to receive, from the various circuits, sensory input indicative of current ambient conditions and current air-treatment system operation. Controller 86 may be further configured to change the operation of air-treatment system 10 when the desired ambient conditions are outside of a predetermined condition range.

Controller 86 may include a memory, a secondary storage device, a processor, and any other components for running an application. Various other circuits may be associated with controller 86 such as power supply circuitry, signal conditioning circuitry, solenoid driver circuitry, and other types of circuitry.

Operator interface 88 may be used to provide inputs indicative of desired ambient conditions to controller 86. These inputs may include: a desired temperature 94, a desired mode 96, and a desired fan speed 98. Desired mode input 96 may include a signal indicating a cooling mode, a heating mode, a defrost mode, and/or a ventilation mode. The operator may also input a desired operator cabin fan speed and/or a desired sleeping cabin fan speed. The desired fan speed input 98 may be a signal provided to controller 86, which may also provide the main on/off indication for air-treatment system 10.

Control system 84 may also be operable to receive input from sensors located in cooling circuit 12, secondary circuit 14, first heating circuit 66, second heating circuit 74, operator cabin 16, and/or sleeping cabin 18 to determine current ambient conditions and current air-treatment system operation. These sensory inputs may include: a compressor discharge temperature sensor 106, a condenser outlet temperature sensor 108, a HX temperature sensor 110, an operator cabin air temperature sensor 112, an operator cabin water valve actuator 114 configured to provide actuator position information, a sleeping cabin air temperature sensor 116, a sleeping cabin water valve actuator 118 also configured to provide actuator position information, and a solar load sensor 120.

Each of these sensors may be different types of sensors and/or provide different types of information. For example, compressor discharge temperature sensor 106 may be a surface-temperature-type sensor that measures refrigerant temperature at the point where the refrigerant exits compressor 22. Condenser outlet temperature sensor 108 may also be a surface-temperature-type sensor that measures refrigerant temperature at the point the refrigerant exits condenser 24. HX temperature sensor 110 may also be a surface-temperature-type sensor. This sensor measures the temperature of cooling fins located on HX 20. Operator and sleeping cabin air temperature sensors 112, 116 may be air-temperature-type sensors that measure the temperature of the air exiting air-treatment system 10 and entering the operator and/or sleeping cabin environments. Operator and sleeping cabin water valve actuators 114, 118 provide position feedback to controller 86 for diagnostic operation. The actuator position feedback includes an active sensor input to controller 86. Solar load sensor 120 may be an illumination-type sensor that measures the intensity of solar light entering the operator cabin environment through the windshield. Solar load sensor 120 may be part of an automatic temperature control function of controller 86.

A greater or lesser number of sensors may be used, and the sensors may be positioned differently and/or provide different types of information. The information from the sensors may be used to automatically adjust air-treatment system operation, diagnose operation of air-treatment system 10, and/or prevent damaging operation of air-treatment system 10.

INDUSTRIAL APPLICABILITY

The disclosed system may be used in any work machine application requiring the treatment of air in response to an indication of a desired ambient condition. For example, in a work machine 5, having operator cabin 16 and sleeping cabin 18, as illustrated in FIG. 1, an operator may indicate a desired ambient condition through operator interface 88 (FIG. 6). The operator may input a desired air temperature 94, a desired mode 96, and a desired fan speed 98. The desired mode input 96 may include a cooling mode, a heating mode, a defrosting mode, and/or a ventilation mode. The desired ambient condition may be indicated for operator cabin 16 and/or sleeping cabin 18. In addition, the desired ambient condition of operator cabin 16 may be indicated simultaneously and as a different desired ambient condition relative to sleeping cabin 18.

As depicted in FIG. 6, the desired ambient condition may be input via operator interface 88. Controller 86 of air-treatment system 10 may receive the input indicative of the desired ambient condition, input indicative of current ambient condition, and input indicative of current air-treatment system operation. Controller 86 may automatically change the performance of air-treatment system 10 when the current ambient condition is outside of a predetermined condition range.

For the purposes of this disclosure a predetermined condition range may include a range of acceptable margin around a desired operator input, in which controller 86 keeps constant the performance of air-treatment system 10. The desired operator input may include, for example, a desired temperature. The predetermined condition range may be determined through lab and/or field testing. Alternately, the predetermined condition range may be determined through other methods such as, for example, operator input.

When a cooling mode is indicated, control system 84 may activate cooling circuit 12, causing compressor 22 to engage and compress the refrigerant. As the refrigerant is pressurized, the temperature of the refrigerant increases. The heated, pressurized refrigerant may then be passed to condenser 24.

Condenser 24 may convert the heated, pressurized refrigerant from a vapor phase to a liquid phase through heat rejection. Heat is removed from the refrigerant as it passes through condenser 24 as condenser fan 28 blows ambient air across condenser 24, thereby cooling the refrigerant. A portion of the cooled refrigerant may then be sent through first TXV 32 and then to VIHX 36, while the remaining portion is sent directly to VIHX 36.

The portion of the refrigerant that flows through TXV 32 expands and drops to a lower temperature as compared to the refrigerant that flows directly to VIHX 36. The two flows of refrigerant may exchange heat in VIHX 36. TXV 32 may meter liquid refrigerant flow in response to a load on VIHX 36 and maintain a desired superheat at a VIHX outlet. TXV 32 provides the necessary pressure drop to deliver a chilled mixture of liquid and vapor refrigerant to VIHX 36. The portion of refrigerant that is expanded through TXV 32 may be returned to compressor 22 after exiting VIHX 36. Before entering HX 20, the sub-cooled refrigerant from VIHX 36 may flow through TXV 44 where the refrigerant is expanded to cause an additional drop in temperature.

TXV 44 may meter liquid refrigerant flow in response to load on HX 20 to maintain a desired superheat at a HX outlet. TXV 44 may provide the necessary pressure drop to deliver a mixture of chilled liquid and vapor refrigerant to HX 20. After expansion in TXV 44, the chilled fluid may flow to HX 20, absorb heat, and then flow back to compressor 22 to begin the cycle anew.

Secondary circuit 14 may be configured to exchange heat with cooling circuit 12 and/or with one or more heating circuits. Low pressure secondary circuit 14 allows the delivery of airflow at an operator-requested temperature and rate without the risk associated with a high-pressure circuit. HX 20 may chill the fluid used to cool the air forced into the operator cabin 16 and sleeping cabin 18.

HX 20 may impart heat from secondary circuit 14 to the chilled fluid of cooling circuit 12 as the fluid, moved by pumps 48, flows through HX 20. After the cooled fluid exits HX 20, it may be directed to heat exchangers 54 of operator cabin 16 and sleeping cabin 18. As the fluid flows through heat exchangers 54, fans 60 may blow intake and/or recirculated ambient air at the desired fan speed across heat exchangers 54, thereby cooling the air to the desired temperature. After receiving heat from the air blown across heat exchangers 54, the then-warmed fluid of the secondary circuit is directed back to HX 20 where it is again chilled.

When a heating mode is indicated, control system 84 may activate first and/or second heating circuits 66, 74. Heating device 68 of first heating circuit 66 and/or engine 76 of second heating circuit 74 may engage to heat the fluid within first and/or second heating circuits 66, 74.

Valves 70 and 72 may be used to control the flow rate of the fluid heated by heating device 68 through secondary circuit 14. Depending on the operator's temperature input and mode input, valves 70 and 72 may be moved between an open position and a closed position to allow flow, restrict flow, and block flow of heated fluid through secondary circuit 14.

When in heating mode, heated fluid may pass from first and/or second heating circuits 66, 74 to secondary circuit 14 where the fluid circulates through heat exchangers 54 of operator cabin 16 and/or sleeping cabin 18. Fans 60 may blow intake and/or recirculated ambient air at the desired fan speed across heat exchangers 54, thereby heating the air to the desired temperature. The flow rate of the heated fluid through heat exchangers 48 may directly affect the temperature of the airflow into operator cabin 16 and sleeping cabin 18.

During the heating operation, first or second heating circuits 66, 74 may be active. During times of cold starting and/or during cold operation, both first and second heating circuits 66, 74 may operate simultaneously. In addition to heating the operator and/or sleeping cabins 16, 18, first heating circuit 66 may be used to heat second heating circuit 74 and engine 76. In this way, engine 76 may be warmed more quickly than under normal operating conditions. Reducing the warm-up time of engine 76 may reduce emissions, improve efficiency and reduce wear of engine 76.

When a defrost mode is input, controller 86 may activate cooling circuit 12 and heating device 59. The cooled liquid of the secondary circuit 14 may be directed to heat exchanger 54 located in operator cabin 16 to remove humidity from the air before the air is heated by heating device 59 and forced into operator cabin 16.

When a ventilation mode is input, control system 84 may activate fans 60 located in operator and/or sleeping cabins 16, 18. Fans 60 may blow intake and/or recirculated ambient air at the desired fan speed. When in a ventilation mode, the coolant in the air-treatment system 10 remains stationary, thereby allowing air that is neither heated nor cooled to enter the operator and/or sleeping cabins. Valves 70 and 72 may be closed during ventilation mode, thereby isolating HX 20 from heat exchangers 54.

In response to a desired fan speed input, controller 86 may adjust the fan speed and deliver the requested airflow. Air-treatment system 10 may be turned on and off based on the desired fan speed input.

Information from the sensors located in cooling circuit 12, secondary circuit 14, first heating circuit 66, second heating circuit 74, operator cabin 16, and sleeping cabin 18 may be used to determine current ambient conditions and current air-treatment system operation. This information may then be used to ensure proper function of air-treatment system 10.

For example, information from the compressor discharge sensor described above, may be used by controller 86 to prevent compressor 22 from operating in a condition that may damage compressor 22. Such conditions may include overheating of the compressor, which may cause overcurrent of an electric compressor drive. In the case of a mechanically-driven compressor, compressor discharge temperature sensor 106 may be replaced with a pressure sensor that sends a signal indicating the mechanically-driven compressor should be switched off when pressures exceed a predetermined limit. Additionally, the condenser outlet temperature sensor information may also be used for compressor protection to prevent compressor 22 from operating in a condition that may damage. Similar to the condenser and compressor sensors, the HX temperature sensor may be used to ensure proper function of HX 20. The information from the HX temperature sensor may be used to prevent HX 20 from freezing, thereby causing diminished cooling performance.

The information from the various sensors may also be used in conjunction with desired ambient condition inputs to automatically adjust the temperature and/or flow rate of the air blown into operator and/or sleeping cabins 16, 18. For example, the operator and sleeping cabin air temperature sensor information may be used as part of a closed circuit temperature control. The sensors may provide air temperature information to controller 86, which may automatically adjust the air-treatment system 10 to deliver the operator requested temperature. In addition, the operator and sleeping cabin water valve actuators 114, 118 may provide position feedback to controller 86 for diagnostic operation. Further, the solar load sensor information may be used to automatically adjust air-treatment system 10 to deliver more or less airflow to the operator to offset the effects of solar warming.

It will be apparent to those skilled in the art that various modifications and variations can be made to the disclosed air-treatment system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A machine, comprising:
    an operator cabin; and
    an air-treatment system including:
        a cooling circuit;
        a first heat exchanger in thermal communication with the cooling circuit;
        a secondary circuit in thermal communication with the first heat exchanger, the secondary circuit operable to selectively transfer heat between the operator cabin of the machine and at least one of the cooling circuit and the first heat exchanger;
        at least one first heating circuit in fluid communication with the secondary circuit;
        a second heating circuit connected to the at least one first heating circuit, the second heating circuit having an engine, and the fluid from the at least one first heating circuit being selectively allowed to flow through the second heating circuit to impart heat to the engine; and
        a controller in communication with at least one of the cooling circuit, the first heat exchanger, and the secondary circuit, the controller operable to receive at least one input indicative of a desired ambient condition of the operator cabin, a current ambient condition of the operator cabin, and of at least one of a cooling circuit operation and a secondary circuit operation, and operable to change the operation of at least one of the cooling circuit and the secondary circuit when the current ambient condition of the operator cabin is outside of a desired ambient condition range.

2. The machine of claim 1, further including:
    a sleeping cabin, wherein the controller is operable to receive input indicative of a desired ambient condition of the sleeping cabin, operable to receive input indicative of a current ambient condition of the sleeping cabin, and operable to change the operation of at least one of the cooling circuit and the secondary circuit when the current ambient condition of the sleeping cabin is outside of a desired ambient condition range.

3. A method of treating ambient air in a machine, comprising:
    operating a cooling circuit to cool a refrigerant;
    operating a secondary circuit to selectively transfer heat from at least one of an operator cabin and a sleeping cabin of the machine to the cooled refrigerant;
    operating a first heating circuit in fluid communication with the secondary circuit to selectively transfer heat to at least one of the operator cabin and the sleeping cabin;
    operating a second heating circuit in fluid communication with the first heating circuit and the secondary circuit to selectively transfer heat to at least one of the operator cabin and the sleeping cabin;
    receiving input indicative of a desired ambient condition;
    receiving input indicative of a current ambient condition;
    receiving input indicative of at least one of a cooling circuit operation and a secondary circuit operation; and
    changing at least one of the cooling circuit operation and the secondary circuit operation when the desired ambient condition is outside of a desired ambient condition range.

4. The method of claim 3, further including allowing a flow of heated fluid from the first heating circuit to the second heating circuit to heat an engine.

5. The method of claim 3, further including heating the flow of air after removing humidity with the cooled fluid in the secondary circuit and then directing the flow of air to the operator cabin.

* * * * *